United States Patent
Otanez (10) Patent No.: US 9,193,353 B2
(45) Date of Patent: Nov. 24, 2015

(54) SYSTEMS AND METHODS FOR CONTROLLING AN AUTOMATIC TRANSMISSION DURING A FLYING ENGINE START USING A FLOW ACCUMULATOR

(71) Applicant: GM GLOBAL TECHNOLOGY OPERATIONS LLC, Detroit, MI (US)

(72) Inventor: Paul Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 149 days.

(21) Appl. No.: 14/067,112

(22) Filed: Oct. 30, 2013

(65) Prior Publication Data

US 2015/0119192 A1    Apr. 30, 2015

(51) Int. Cl.
*B60W 20/00*    (2006.01)
*B60W 10/02*    (2006.01)
*B60W 10/06*    (2006.01)
*B60W 10/08*    (2006.01)
*B60W 10/11*    (2012.01)

(52) U.S. Cl.
CPC ............... *B60W 20/40* (2013.01); *B60W 10/02* (2013.01); *B60W 10/06* (2013.01); *B60W 10/08* (2013.01); *B60W 10/11* (2013.01); *B60W 20/10* (2013.01); *B60W 20/30* (2013.01); *Y10S 903/902* (2013.01)

(58) Field of Classification Search
CPC ..... B60W 20/10; B60W 20/30; B60W 20/40; Y10S 903/902
See application file for complete search history.

(56) References Cited

U.S. PATENT DOCUMENTS 3,905,459 A * 9/1975 Liebich ...................... 192/109 F
8,965,650 B1 * 2/2015 Otanez et al. .................. 701/67

* cited by examiner

*Primary Examiner* — Colby M Hansen
(74) *Attorney, Agent, or Firm* — Quinn Law Group, PLLC (57) ABSTRACT

A system and method can control a transmission during a flying engine start. The method includes receiving a request for an internal combustion engine to be started while a vehicle is solely driven by an electric motor-generator. Further, the method determining a time lapse between a moment when a first clutch starts to be filled and a moment when a second clutch starts to be filled such that the first clutch and the second clutch reach first and second clutch pressure thresholds, respectively, at substantially the same time. The method includes transferring transmission fluid to the first clutch and transferring transmission fluid to the second clutch after the determined time lapse has passed since the first clutch started to be filled.

20 Claims, 3 Drawing Sheets

SYSTEMS AND METHODS FOR CONTROLLING AN AUTOMATIC TRANSMISSION DURING A FLYING ENGINE START USING A FLOW ACCUMULATOR

TECHNICAL FIELD

The present disclosure relates to a system and method for controlling a transmission during a flying engine start.

BACKGROUND

A hybrid vehicle may include a transmission, an internal combustion engine, and an electric motor. Accordingly, the vehicle can be propelled by the internal combustion engine, the electric motor, or both. Sometimes, the vehicle may be solely driven by the electric motor. At some point, however, the vehicle operator may request additional torque while the vehicle is propelled by the electric motor. The vehicle operator may request additional torque by, for example, pressing an accelerator pedal. In response to this torque request by the vehicle operator, the internal combustion engine may start while the vehicle is propelled by the electric motor. Such engine start is referred to as a flying engine start. The term "flying engine start" therefore means a process in which the internal combustion engine of a vehicle starts while the vehicle is solely driven by one or more electric motors.

SUMMARY

This disclosure relates to a method and system for controlling a transmission during a flying engine start. During a flying engine start, the engine should be operated at an engine speed that is sufficient to allow one or more clutches of a transmission to be engaged. Once the clutches of the transmission are engaged, the torque generated by the internal combustion engine can be transferred to the axles of the vehicle via the transmission. It is therefore desirable to minimize the time it takes to transfer torque from the engine to an axle of a vehicle during a flying engine start.

The present disclosure relates to a method for controlling a transmission during a flying engine start. In particular, the presently disclosed method can minimize the amount of time it takes to transfer torque from the engine to the axles of a vehicle by using a flow accumulator during a flying engine start. The term "flow accumulator" refers to an energy storage device that maintains the non-compressible hydraulic fluid under pressure by an external source. The accumulator may be a piston/spring type or a gas filled type accumulator having a spring or compressible gas, respectively, that provides a compressive force on the hydraulic fluid. In an embodiment, the method includes receiving a request for an internal combustion engine to be started to generate a level of transmission output torque while a vehicle is solely driven by an electric motor-generator. The vehicle includes an internal combustion engine, an electric motor-generator, a transmission, and a flow accumulator. The transmission includes a first clutch and a second clutch. The method further includes determining a gear ratio in the transmission according to the level of transmission output torque and determining a time lapse between a moment when the first clutch starts to be filled and a moment when the second clutch starts to be filled such that the first clutch and the second clutch reach first and second clutch pressure thresholds, respectively, at substantially the same time. The method further includes transferring transmission fluid from the flow accumulator to the first clutch and transferring at least some of the transmission fluid from the flow accumulator to the second clutch after the determined time lapse has passed since the first clutch started to be filled.

The present disclosure also relates to a system for controlling a transmission during a flying engine start. The system includes a flow accumulator containing transmission fluid and a first valve in fluid communication with the flow accumulator. The first valve is configured to control the flow of transmission fluid between the flow accumulator to and a first clutch. The system further includes a second valve in fluid communication with the flow accumulator. The second valve is configured to control the flow of transmission fluid between the flow accumulator and the second clutch. The system further includes a controller in communication with the first and second valves. The system may be part of a vehicle. The vehicle includes an engine, an electric motor-generator, a transmission, and a flow accumulator. The transmission includes a first clutch and a second clutch. The controller is configured to perform the following functions: (a) receive a request for the internal combustion engine to be started to generate a level of transmission output torque while the vehicle is solely driven by the electric motor-generator; (b) determine a gear ratio in the transmission according to the level of transmission output torque; (c) determine a time lapse between a moment when the first clutch starts to be filled and a moment when the second clutch starts to be filled such that the first clutch and the second clutch reach first and second clutch pressure thresholds, respectively, at substantially the same time; (d) send a first clutch command to the first valve such that the first valve allows the transmission fluid to be transferred from the flow accumulator to the first clutch; and (e) send a second clutch command to the second valve such that the second valve allows at least some of the transmission fluid to be transferred from the flow accumulator to the second clutch after the determined time lapse has passed since the first clutch started to be filled.

This disclosure also relates to a hybrid vehicle. The vehicle includes an axle, an engine, an internal combustion engine operatively coupled to the axle, an electric motor-generator, and a transmission operatively coupled between the engine and the axle. The transmission is configured to transfer torque from the engine to the axle. Further, the transmission includes a first clutch and a second clutch. The vehicle further includes a flow accumulator containing transmission fluid and a first valve operatively coupled between the flow accumulator and the first clutch. The first valve is configured to control the flow of transmission fluid between the flow accumulator and the first clutch. The vehicle further includes a second valve operatively coupled between the flow accumulator and the second clutch. The second valve is configured to control the flow of transmission fluid between the flow accumulator and the second clutch. The vehicle further includes a controller in communication with the first and second valves. The controller is configured to perform the following functions: (a) receive a request for an engine to be started to generate a level of transmission output torque while the vehicle is solely driven by the electric motor-generator; (b) determine a gear ratio in the transmission according to the level of transmission output torque; (c) determine a time lapse between a moment when the first clutch starts to be filled and a moment when the second clutch starts to be filled such that the first clutch and the second clutch reach first and second clutch pressure thresholds, respectively, at substantially the same time; (d) send a first clutch command to the first valve such that the first valve allows fluid to be transferred from the flow accumulator to the first clutch; and (e) send a second clutch command to the second valve such that the second valve allows fluid to be transferred from the flow accumulator to the second clutch after the determined time lapse has passed since the first clutch started to be filled.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
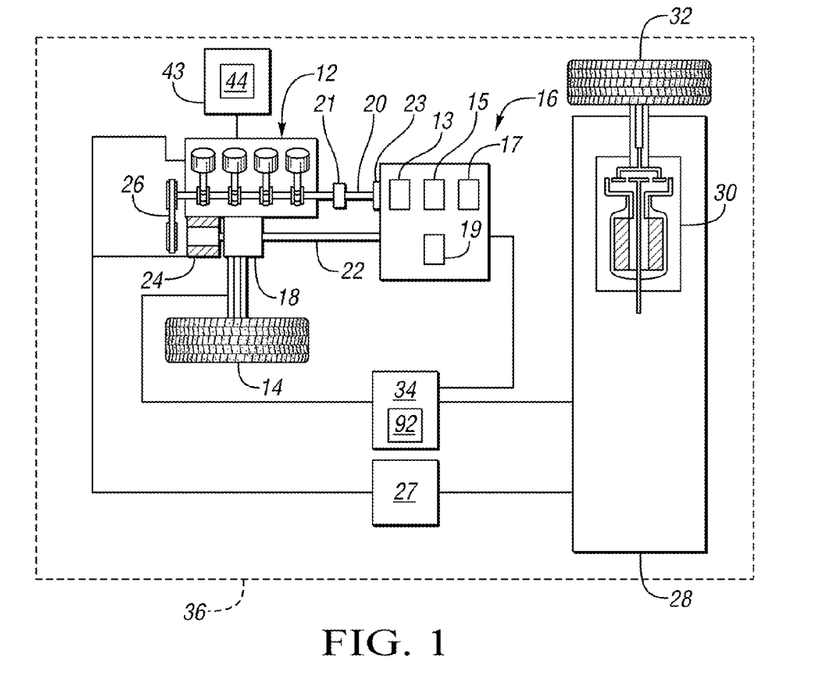
FIG. 1 is a schematic block diagram of an electric hybrid vehicle.

Referring to the drawings in which like elements are identified with identical numerals throughout, FIG. 1 illustrates a hybrid vehicle 36 equipped with an electric all-wheel drive system. The vehicle 36 includes an internal combustion engine 12 configured to drive the vehicle via a first set of wheels 14 through an automatic transmission 16 and a first axle 18. The internal combustion engine 12 is coupled to the first axle 18. As contemplated herein, the automatic transmission 16 is a multi-speed automatically-shiftable transmission that utilizes a gear train and multiple torque transmitting devices to generate discrete gear ratios between an input member 20 and an output member 22 of the transmission 16. The input and output members 20, 22 may be input and output shafts, respectively. The output member 22 is coupled to the first axle 18, while the input member 20 is coupled to the internal combustion engine 12. Accordingly, the automatic transmission 16 is coupled between the internal combustion engine 12 and the first axle 18. Hence, the automatic transmission 16 is configured to transfer torque from the internal combustion engine 12 to the first axle.

The automatic transmission 16 may include various gear trains, planetary gear sets, and torque transmitting devices, such as clutches and/or brakes. In the depicted embodiment, the automatic transmission 16 includes first, second, and third clutches 13, 15, and 17 using pressurized fluid supplied by a flow accumulator 23 (see also FIGS. 3 and 4). As used herein, the term "clutch" refers to any type of friction torque transfer device including, without limitation, hydraulically-applied rotating friction clutches, single or compound plate clutches or packs, band clutches, and brakes or any suitable friction clutch. Although the drawings illustrate three clutches, it is envisioned that the transmission 16 may include more or fewer clutches. The flow accumulator 23 is operatively connected to the input member 20 of the transmission 16 and is disposed in fluid communication with the first, second, and third clutches 13, 15, and 17. The flow accumulator 23 contains transmission fluid and, in operation, generates fluid pressure to apply to the first, second, and third clutches 13, 15, 17. The automatic transmission 16 may be, for example, a type that includes at least one specific gear ratio that requires full engagement or lock-up of a plurality of torque transmitting devices (e.g., first, second, and third clutches 13, 15, 17) in order to select the subject gear ratio and complete a desired gear shift. The vehicle 36 may include a torque converter 21 between the engine 12 and the automatic transmission 16.

The automatic transmission 16 may further include a temperature sensor 19 for determining the temperature of the automatic transmission fluid (ATF) in the transmission 16. The temperature sensor 19 may be a thermistor and can send a signal to a controller 34 indicative of the temperature of the ATF in the transmission 16. The controller 34 includes a clock or timer 92.

The vehicle 36 also includes a first electric motor-generator 24. In the example embodiment, the first motor-generator 24 may be configured as an integrated starter-generator (ISG) or a 12 volt stop-start motor. The ISG contemplated herein is a 36 volt or greater motor-generator that is connected directly to the engine 12 via a belt 26 and receives its electrical energy from an energy storage device 27, such as one or more batteries. As shown, the first motor-generator 24 is used for quickly starting and spinning the engine 12 up to operating speeds as part of an engine stop-start arrangement. Additionally, the first motor-generator 24 may be used for generating electrical energy for use by accessories (not shown) of the vehicle 36, such as power steering and a heating, ventilation and air conditioning (HVAC) system.

The vehicle 36 additionally includes a second axle 28. The second axle 28 may be driven without the aid of the engine 12, transmission 16, and first motor-generator 24. The second axle 28 includes a second electric motor-generator 30 that is configured to drive the vehicle 36 via a second set of wheels 32. The second motor-generator 30 receives its electrical energy from the energy storage device 27. Accordingly, the second motor-generator 30 is configured to drive the vehicle 36 without the aid of the engine 12 and provides the vehicle 36 with an on-demand electric axle drive. When the vehicle 36 is driven solely via the second motor-generator 30, the vehicle 36 is operated in a purely electric vehicle or "EV" mode. Furthermore, when both first and second axles 18, 28 are driven by their respective power sources, the engine 12 and the second motor-generator 30, the vehicle 36 is endowed with all-wheel drive (AWD).

The vehicle 36 may be driven solely by the second motor-generator 30 while the engine 12 is shut off and the transmission 16 is placed in neutral in order to conserve fuel and improve the vehicle's operating the efficiency. The engine 12 may, for example, be shut off when the vehicle 36 is maintaining a steady cruising speed which may be sustained solely by the torque output of the second motor-generator 30. Additionally, the engine 12 may be shut off when the vehicle 36 is in a coast down mode, i.e., when the vehicle is decelerating from elevated speeds, or when the vehicle is stopped. In a situation when the vehicle 36 is maintaining a steady cruising speed, the engine 12 may, at any moment, be restarted to participate in driving the vehicle 36. In order to participate in driving the vehicle 36, the engine 12 will be called upon to generate an appropriate level of engine torque that will result in a certain level of transmission output torque, i.e., transmission torque at the output member 22.

The level of transmission output torque may be representative of whether the vehicle 36 is to be driven in an electric all-wheel drive mode or in an engine-only drive mode. When the vehicle 36 is to be driven in the electric all-wheel drive mode after the engine restart, the level of torque is determined in response to a request generated by the vehicle's operator. When the vehicle 36 is to be driven in the engine-only drive mode, the second motor-generator 30 will need to be phased out as the engine 12 is being phased in. Such a situation may develop when the energy supplied to the second motor-generator 30 by the storage device 27 is below a predetermined threshold value that is sufficient to operate the second motor-generator 30.

The vehicle 36 also includes a controller 34 that is responsible for accomplishing the flying start of the engine 12. As envisioned herein, the controller 34 may be an electronic control unit (ECU) that is employed to regulate and coordinate the hybrid propulsion of the vehicle 36 which includes the operation of the engine 12, the transmission 16, and the first and second motor-generators 24, 30. The controller 34 is configured to receive a request for the engine to be started when the vehicle 36 is being driven solely via the second motor-generator 30. The controller 34 is also configured to control the engine 12 to generate the level of transmission output torque according to whether the vehicle 36 is to be driven in the electric all-wheel drive mode or in the engine-only drive mode. Additionally, the controller 34 is programmed to control the application of fluid pressure required to lock-up individual torque transmitting devices inside the transmission 16 in order to place the transmission into a particular gear ratio.

The controller 34 may include one or more control modules capable of controlling the operation of engine 12, the first motor-generator 24, the second motor-generator 30, the transmission 40, or a combination thereof. Controls can be employed by the control modules synchronizing operation of the different devices in order to maintain drivability of the overall powertrain. "Control module," "module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed based on events or at regular intervals.

The controller 34 is also programmed to determine a desired engine speed and a gear ratio in the transmission 16 according to the level of transmission output torque. For example, the desired speed of the engine 12 and the appropriate gear ratio in the transmission 16 may be selected from a table of mapped data that was gathered during testing and development of the vehicle 36. Such a table of mapped data may also be programmed into the controller 34 in order for the level of transmission output torque to be cross-referenced by the controller against the torque curve of the engine 12, allowable engine speeds, and transmission gear ratios at the present speed of the vehicle 36. Accordingly, the controller 34 may then select the most efficient combination of gear ratio, engine speed, and engine fueling to generate the level of transmission output torque for driving the vehicle 36 in response to the received request for the engine 12 to be restarted.

The gear ratio to be selected in the transmission 16 by the controller 34 for generating the transmission output torque requires locking up one or more torque transmitting devices (e.g., first, second, and third clutches 13, 15, 17). Accordingly, the controller 34 is additionally programmed to start the engine 12 via the first motor-generator 24 for generating the level of transmission output torque. Additionally, the controller 34 is programmed to modulate the engagement of certain number of transmission torque transmitting devices (e.g., first, second, and third clutches 13, 15, 17) such that the torque capacity of the torque transmitting devices is gradually increased. Modulation of the engagement of the torque transmitting devices may be accomplished by varying pressure of the fluid that is used to actuate the device. Such modulation of the torque transmitting devices serves to adjust the device torque capacity and internal slippage, which, in turn, results in relative motion between the input member 20 and output member 22.

The controller 34 is also programmed to control the engine 12 to generate the desired engine speed while the engagement of the one remaining torque transmitting device is being modulated. The modulation of the engagement of the one remaining torque transmitting device may be undertaken together or substantially simultaneously until the desired engine speed has been generated and the speed of the output member 22 is generally equal to the speed of the input 20 divided by the chosen gear ratio. The engine speed can be control to reach a threshold that is greater than or less than the transmission output speed divided by the speed ratio of the transmission 16. If the vehicle 36 includes the torque converter 21, the engine speed should be greater than the input speed. For example, controlling the engine 12 to generate the desired engine speed may be accomplished by controlling the engine torque output via at least one of regulating engine fuel rate, retarding engine spark, and regulating the torque of the first motor-generator 24. Typically, retarding an internal combustion engine spark ignites the air-fuel mixture inside the engine cylinders later in the combustion process, which tends to allow less time for the combustion to take place and reduces the engine torque output. If the vehicle 36 includes the torque converter 21, the engine speed is not equal to transmission input speed. However, the engine speed can be adjusted until the desired transmission input speed is obtained.

The controller 34 is additionally programmed to regulate the engine 12 and the first motor-generator 24 such that combined torque input from the engine 12 and the first motor-generator to the transmission 16 is approximately zero. Accordingly, during such regulation, the combined torque output of the first motor-generator 24 and the engine 12 is maintained at a level that is substantially equal to the torque required to spin the engine at the desired speed. The controller 34 is additionally programmed to modulate the engagement of certain number remaining torque transmitting devices such that the torque capacity of the torque transmission devices is gradually increased. Additionally, the modulation of the certain number of torque transmitting devices may be accomplished by increasing the fluid pressure to the subject device until substantially all the slip inside the device is eliminated. Therefore, the torque transmitting devices are permitted to be fully locked up by the controller 34 when the slip across the clutch(es) is zero.

Furthermore, the controller 34 is programmed to control the engine 12 to generate the level of transmission output torque. Controlling the engine 12 to generate the level of transmission output torque may be accomplished via regulating engine fuel rate, advancing engine spark, and regulating the torque of the first motor-generator 24. Typically, advancing an internal combustion engine spark ignites the air-fuel mixture inside the engine cylinders earlier in the combustion process, which tends to allow additional time for the combustion to take place and increases the engine torque output.

The vehicle 36 further includes an accelerator pedal 43 that enables a vehicle operator to adjust the position of a throttle (not shown) of the engine 12 to achieve a desired engine power output. Alternatively, the vehicle 36 could further include an accelerator pedal position sensor 44 capable of generating a pedal position signal indicating a position of the accelerator pedal 43. The accelerator pedal sensor 44 can be in electronic communication with the controller 34. The controller 34 can receive the pedal position signal from the accelerator pedal sensor 44 and can adjust the position of the throttle (not shown) of the engine 12 accordingly, which in turn adjusts the fuel delivery to the engine 12 based on the airflow.

Figure 2:
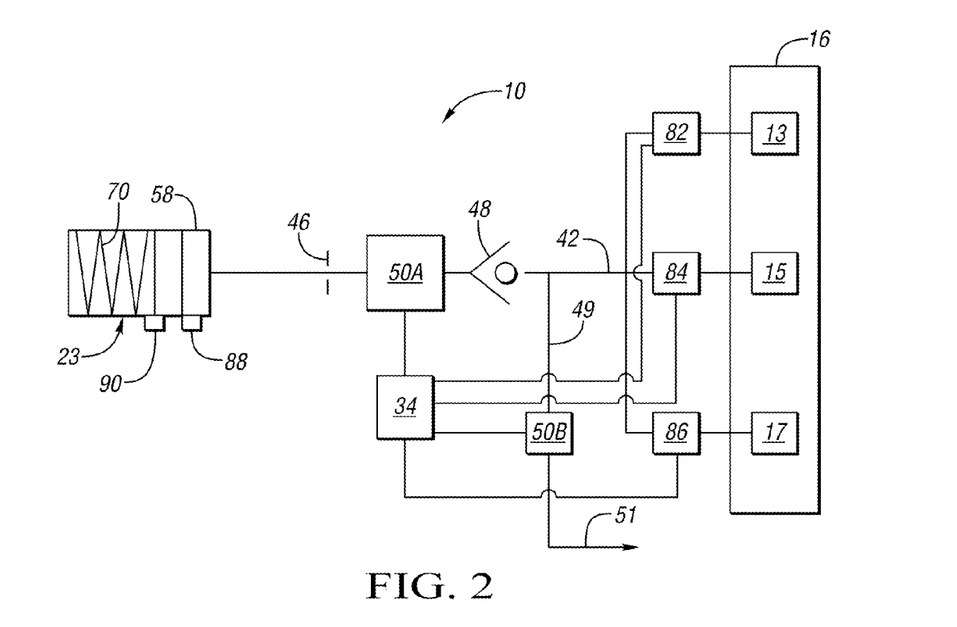
FIG. 2 is a schematic block diagram of a fluid supply system of the hybrid vehicle shown in FIG. 1.

Referring now to FIGS. 1 and 2, the vehicle 36 includes a fluid supply system 10 for applying fluid or hydraulic pressure to the first, second, and third clutches 13, 15, 17. The fluid supply system 10 includes a main supply line 42 disposed in fluid communication with the transmission 16. In addition, the fluid supply system 10 includes the flow accumulator 23, a flow restricting orifice 46, a one-way or ball check valve 48, and one or more solenoid valves 50A. The one-way valve 48 is optional. The flow restricting orifice 46 is in fluid communication with the main supply line 42 and the one-way valve 48. The accumulator 23 includes a piston 58 and a return spring 70 and is in fluid communication with the solenoid valve 50A. The solenoid valve 50A may be electrically energized to open and provide fluid communication and flow therethrough out of the accumulator 23 to the one-way or ball check valve 48. The one-way valve 48 permits fluid flow from the main supply line 42 but prevents flow from the accumulator 23. In other words the one-way valve 48 allows flow into the accumulator 23, but not out of it. In one embodiment, the one-way valve 48 is in a parallel path to the solenoid valve 50A, thereby allowing a passive fill of the accumulator 23 whenever the feed pressure is higher than the accumulator pressure. In this case, the solenoid valve 50A could be opened to increase the flow rate into the accumulator 23. In another embodiment, the fluid supply system 10 does not include a one-way valve 48 and the flow in/out of the accumulator 23 is entirely controlled by the solenoid valve 50A.

The fluid supply system 10 may further include first, second, and third shutoff valves 82, 84, 86. The flow accumulator 23 is in fluid communication with the first, second, and third shutoff valves 82, 84, 86. The first shutoff valve 82 is disposed in fluid communication with the first clutch 13 and can prevent or allow fluid flow to the first clutch 13. The first shutoff valve 82 is coupled between the fluid accumulator 23 and the first clutch 13. Accordingly, the first shutoff valve 82 can control the flow of transmission fluid 51 between the flow accumulator 23 and the first clutch 13. The second shutoff valve 84 is disposed in fluid communication with the second clutch 15 and can prevent or allow fluid flow to the second clutch 15. The second shutoff valve 84 is coupled between the fluid accumulator 23 and the second clutch 15. Accordingly, the second shutoff valve 84 can control the flow of transmission fluid 51 between the flow accumulator 23 and the second clutch 15. The third shutoff valve 86 is disposed in fluid communication with the third clutch 17 and can prevent or allow fluid flow to the third clutch 17. The third shutoff valve 86 is coupled between the flow accumulator 23 and the third clutch 17. Accordingly, the third shutoff valve 86 can control the flow of transmission fluid 51 between the flow accumulator 23 and the third clutch 17. The first, second, and third shutoff valves 82, 84, 86 may be solenoid valves electronically coupled to the controller 34. In other words, the controller 34 is in communication (e.g., electronic communication) with the first, second, and third shutoff valves 82, 84, 86. In addition to the first, second, and third shutoff valves 82, 84, 86, the fluid supply system 10 may include a pressure sensor 88 for determining the pressure of the transmission fluid 51 in the flow accumulator 23. The pressure sensor 88 may be a piezoresistive strain gauge and can measure the pressure in a first chamber 62 (FIG. 3) of the flow accumulator 23. Moreover, the pressure sensor 88 is electronically coupled to the controller 34. The fluid supply system 10 may further include an accumulator volume sensor 90 capable of determining the volume of the transmission fluid 51 in the flow accumulator 23. For example, the accumulator volume sensor 90 may be a flow rate sensor and may measure the volume of transmission fluid exhausted from the flow accumulator 23. In the absence of a pressure sensor, the accumulator pressure could be calculated in the controller 34 using a first principles model of the flow in/out of the accumulator as well as calculated or measured line pressure and accumulator parameters such as volume, spring stiffness among others. Alternatively, the accumulator pressure can also be calculated from look up tables which are the output of the simulation.

The fluid supply system 10 further includes a secondary line 49 for supplying fluid to other vehicle components (not shown) such as a power steering system and gears of the transmission 16. Another solenoid valve 50B is disposed along the secondary line 49 and can control fluid flow along the secondary line. 49. For example, the solenoid valve 50B may close so that the transmission fluid 51 can only flow into the clutches 13, 15, and 17. The transmission fluid 51 may be oil. The fluid supply system 10 may be referred to as a system and may include the controller 34.

Figure 3:
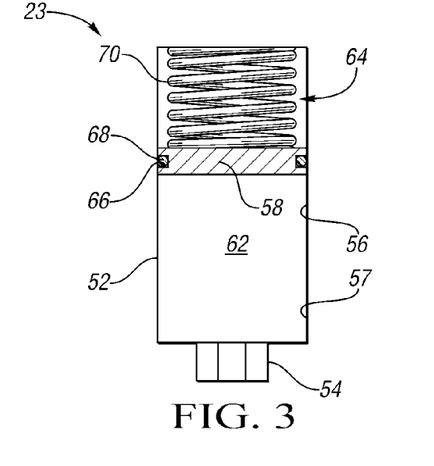
FIG. 3 is a schematic, enlarged side view of a flow accumulator of the fluid supply system of FIG. 2 in a filled state.
Figure 4:
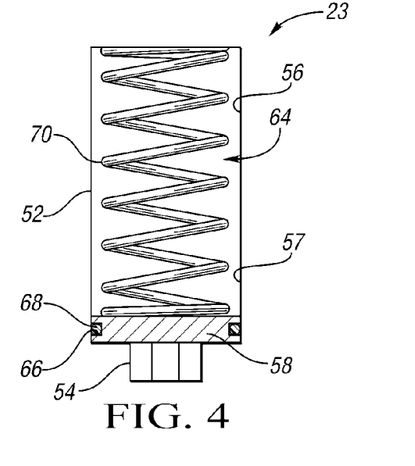
FIG. 4 is a schematic, enlarged side view of the flow accumulator of FIG. 3 in an unfilled state.

Referring now to FIGS. 2, 3, and 4, the flow accumulator 23 includes a generally cylindrical housing 52 having an inlet/outlet port 54 disposed in fluid communication with the main fluid supply line 42 and the secondary line 49. The housing 52 defines an inner cavity 56 forming the first chamber 62 of the flow accumulator 23. The flow accumulator 23 contains transmission fluid 51 (see FIG. 2) and includes the piston 58, which is movably disposed in the inner cavity 56. The piston 58 divides the inner cavity 56 into a first chamber 62 and a second chamber 64 on the opposite side or face of the piston 58. Moreover, the piston 58 defines a circumferential channel or groove 66 that receives an O-ring seal 68 for establishing a fluid tight seal between the piston 58 and the inner housing surface 57 defining the inner cavity 56 and between the chambers 62 and 64. An additional groove 66 and O-ring seal 68 may be incorporated in the piston 58, as well as other seal types, if desired. The oil storage volume of the flow accumulator 23 in automatic transmission hydraulic systems may be less than about 0.3 liters.

The flow accumulator 23 further includes a compression or return spring 70 disposed in the second chamber 64. The compression spring 70 may take many forms and may have a spring constant (rate) that varies significantly depending upon the particular application and system pressure. Further, the compression spring 70 may be a coil spring, as illustrated, although helical (spiral) springs or stacked spring washers or Belleville springs and other spring configurations may be utilized. In FIG. 3, the accumulator 23 is presented in a compressed state, whereas, in FIG. 4, the piston 58 of the accumulator 23 has translated a full stroke to its travel limit. The movement of the piston 58 causes transmission fluid 51 (FIG. 2) confined in the first chamber 62 of the flow accumulator 23 to flow out of the flow accumulator 23 via the inlet/outlet port 54 and proceed toward the main supply line 42.

Figure 5:
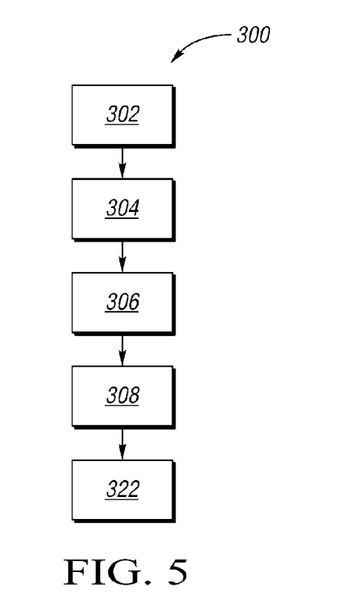
FIG. 5 is a flowchart illustrating a method of controlling a transmission during a flying engine start.

FIG. 5 illustrates a flowchart of a method 300 of controlling the transmission 16 during a flying engine start. Before a flying engine start, the engine 12 is initially stopped, and the first motor-generator 24, second motor-generator 30, or both power the vehicle 36. During the flying engine start, the engine 12, which was previously disconnected from the transmission 16, is accelerated from an initial speed (e.g., zero) to a speed that is synchronous with a speed of the input member 20 of the transmission 16 such that a clutch (e.g., first clutch 13, second clutch 15, or third clutch 17) connecting the engine 12 to that output member 22 can be locked and the engine 12 can provide torque to the first axle 18, the second axle 28, or both. It is desirable to minimize the time it takes to transfer torque from the engine 12 to the first axle 18, second axle 28, or both during a flying engine start. To do so, it may be useful to control the transmission 16 such that the first clutch 13 and second clutch 15 can be completely filled or reach a predetermined fill or pressure threshold at substantially the same time. When the first clutch 13 and second clutch 15 are fully filled or reach respective predetermined fill threshold, the engine 12 can transmit torque to the first axle 18, second axle 28, or both, via the transmission 16. The predetermined fill threshold may be based at least in part on clutch position, volume, and/or pressure. It may also be useful to control the transmission 16 such that the first clutch 13, second clutch 15, and third clutch 17 reach a predetermined fill or pressure threshold at substantially the same time.

Figure 7:
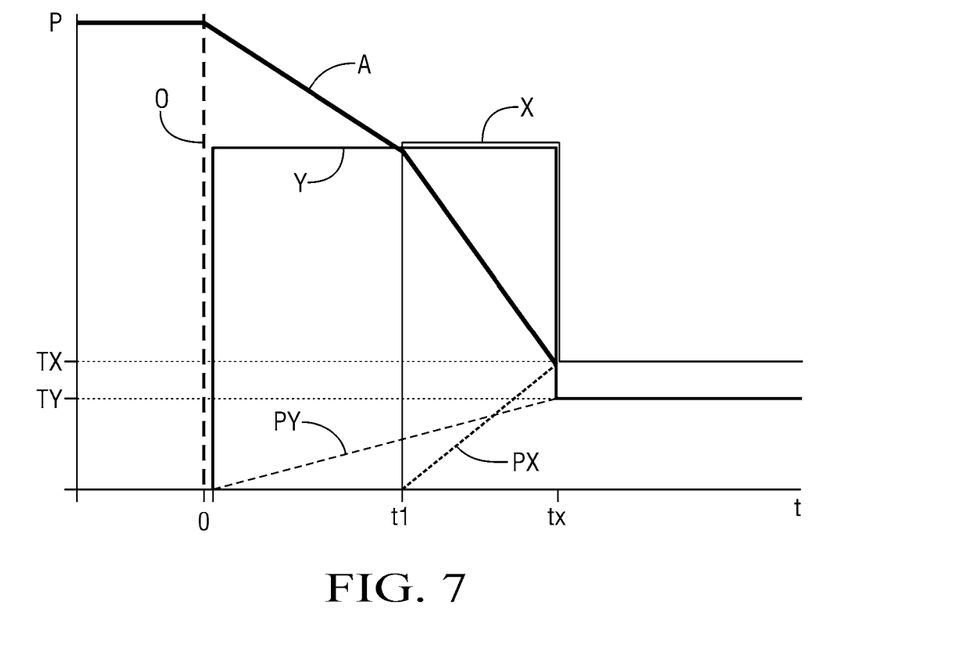
FIG. 7 is a graph illustrating some performance characteristics of the vehicle of FIG. 1 when performing the method of FIG. 5 in accordance with an embodiment of the present disclosure, wherein the horizontal axis is time (t) and the vertical axis is pressure command (P)
Figure 8:
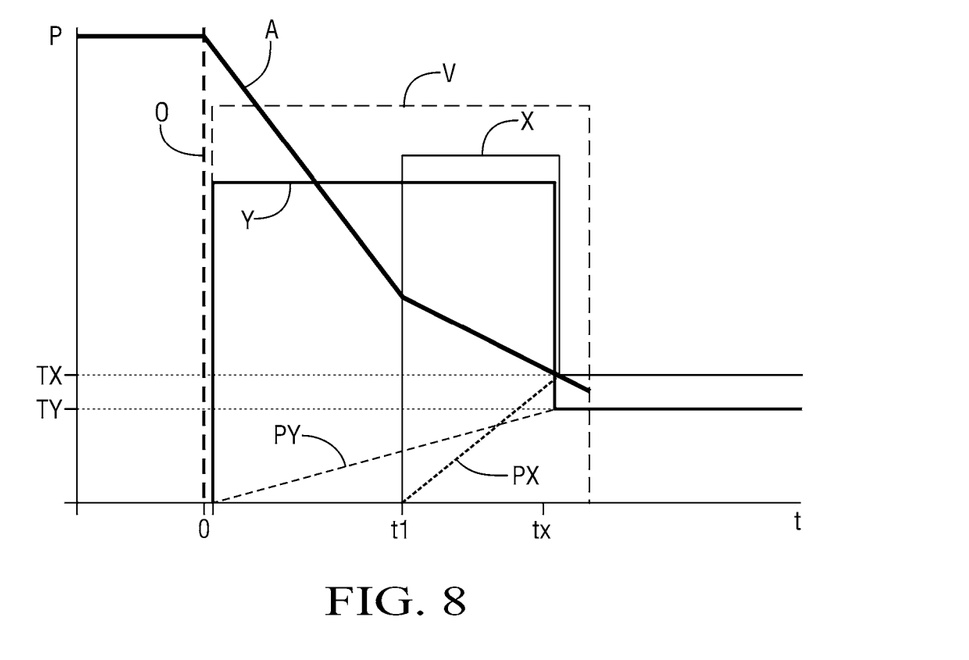
FIG. 8 a graph illustrating some performance characteristics of the vehicle of FIG. 1 when performing the method of controlling a transmission in accordance with another embodiment of the present disclosure, wherein the horizontal axis is time (t) and the vertical axis is a pressure command (P).

FIG. 5 illustrates a method 300 of controlling an automatic transmission during a flying engine start, while FIGS. 7 and 8 graphically illustrate the transmission operation in accordance with the method 300. These graphs include a horizontal axis, which corresponds to time (t) in seconds, and a vertical axis, which corresponds to a pressure command (P) in kilopascals. The method 300 begins at step 302. At step 302, the controller 34 receives a request for the engine 12 to be started for generating a level of transmission output torque while the vehicle 36 is driven solely by the first electric motor-generator 24, the second electric motor-generator 30, or both. In FIGS. 7 and 8, the request for the engine 12 to be turned on is illustrated by dashed line O. This request may be in the form of an output signal generated by the accelerator pedal position sensor 44. Then in step 304, the controller 34 determines the desired engine speed and a gear ratio in the transmission 16 according to the level of transmission output torque. Further, in step 304, the controller 34 determines which clutches 13, 15, 17 need be engaged to achieve the gear ratio based on the level of transmission output torque. For instance, the controller 34 may determine that the first clutch 13 and the second clutch 15 should be engaged to achieve the gear ratio. Thus, in this case, the first and second clutches 13, 15 are referred to as the designated clutches. However, it is envisioned, that more or fewer clutches may be engaged to achieve the gear ratio.

At step 306, the controller 34 may determine the clutch command timing and sequence for the designated clutches 13, 15, or 17, such that the designated clutches 13, 15, or 17 are fully filled or reach a predetermined threshold (pressure, volume, and/or displacement threshold) at substantially the same time. When the designated clutches 13, 15, or 17 are fully filled or reach a predetermined threshold (pressure, volume, and/or displacement threshold), the designated clutches 13, 15, or 17 are engaged and can transfer torque from the engine 12 to the first axle 18. Step 306 includes determining the clutch command sequence. That is, the controller 34 determines which of the designated clutches (e.g., first clutch 13, second clutch 15, or third clutch 17) should receive transmission fluid 51 (FIG. 2) first. In other words, the controller 34 determines which of the designated clutches (clutches 13, 15, or 17) should be applied first. For example, the controller 34 may determine that the clutch (e.g., first clutch 13, second clutch 15, or third clutch 17) that has the largest volume or the smallest orifice should be partially filled first. For illustration purposes only, it is assumed that the first clutch 13 has the largest volume or the smallest orifice. Thus, step 306 may include determining, via the controller 34, the volumes of the clutches 13, 15, 17 in order to determine which clutch 13, 15, 17 should be partially filled first. The controller 34 may already contain in its memory data about the volumes of the clutches 13, 15, 17. Therefore, step 306 may entail determining which of the clutches 13, 15, or 17 has to receive the transmission fluid 51 first based on, for example, the volumes of the clutches 13, 15, or 17.

At step 306, the controller 34 may also determine when to begin to apply another one of the designated clutches (13, 15 or 17) after one of the designated clutches has been partially applied or after the controller 34 receives a request to start the engine 12. In FIGS. 7 and 8, the time t1 represents the moment when a second designated clutch (13, 15, or 17) starts receiving transmission fluid 51 from the flow accumulator 23 after the first clutch has started to be filled or after the controller 34 receives a request to start the engine 12. Thus, at time t1, such second designated clutch (13, 15, or 17) starts to be filled with transmission fluid 51. Hence, in step 306, the controller 34 determines the desired time lapse t1 between the moment when the one of the designated clutches (13, 15, or 17) starts to fill with transmission fluid 51 and the moment when another designated clutch (13, 15, or 17) should begin to receive transmission fluid 51 (i.e., starts to fill) in order to minimize the time it takes to transfer torque from the engine 12 to the first axle 18, second axle 28, or both during a flying engine start.

The desired time lapse t1 may be obtained from a table generated using simulation or testing. Further, the desired time lapse t1 may be based on, among other things, the automatic transmission fluid temperature, accumulator pressure, the maximum accumulator pressure, the volumes of the clutches 13, 15, 17, the size of the orifice 46 and any other flow restrictions, the accumulator volume (in the first chamber 62), and the drain down volume of valves in the fluid supply system 10 (e.g., drain down volume of valve 50A). The size of the orifice 46 (and any other flow restrictions) and the drain down volume of the valves (e.g., valve 50A) may be known. The orifice 46 may be referred to as a flow restriction. The automatic transmission fluid temperature may be obtained from the temperature sensor 19. Because the desired time lapse t1 may depend on the automatic transmission fluid temperature, step 306 further includes determining the automatic transmission fluid temperature. The accumulator pressure may be obtained from the pressure sensor 88 or from a mathematical model, and the accumulator volume may be derived from the accumulator pressure. Because the desired time lapse t1 depends on the accumulator volume, accumulator pressure, or both, the step 306 further includes determining the pressure and volume of the transmission fluid 51 in the flow accumulator 23. Specifically, the step 306 may include determining the pressure or volume of the transmission fluid 51 in the first chamber 62 (FIG. 3) of the flow accumulator 23.

After determining the clutch command timing and sequence, at step 308, the controller 34 sends clutch commands to the appropriate valves (82, 84, or 86) to begin filling the appropriate clutches (13, 15, or 17) at the determined time in the determined sequence. If more than two clutches 13, 15, 17 are needed to achieve the level of transmission output torque, the controller 34 may also determine the time lapse t2 between the moment when the second clutch that started to fill (13, 15, or 17) and the moment when another clutch (13, 15, or 17) should begin to fill to minimize the time it takes to transmit torque from the engine 12 to the first axle 18, second axle 28, or both during a flying engine start. In another embodiment, the pressures at the clutches could be monitored using pressure sensors instead of using time.

Figure 6:
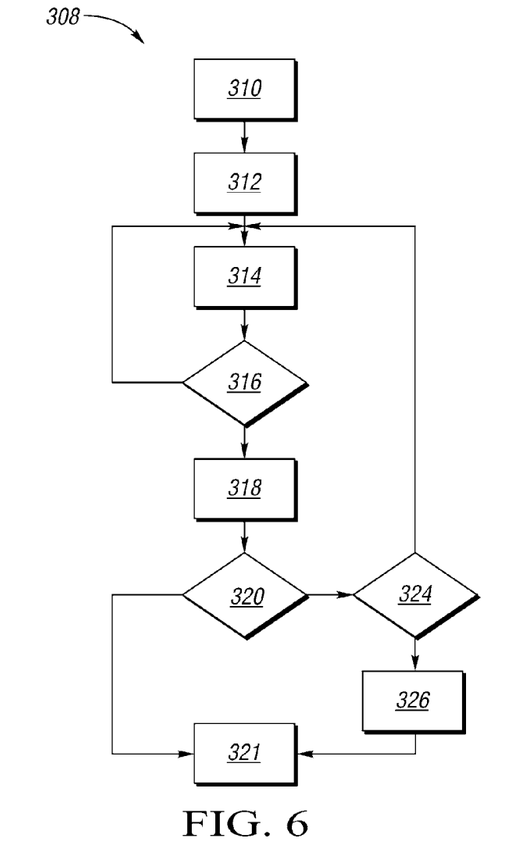
FIG. 6 is a flowchart illustrating part of the method illustrated in the flowchart shown in FIG. 5.

With reference to FIG. 6, step 308 includes various sub-steps. Step 308 begins at block 310. At block 310, the controller 34 sets the timer 92 (FIG. 1) to zero. Then at step 312, the controller 34 sends a first clutch command to one of the shutoff valve 82, 84, 86 to start filling the clutch (13, 15, or 17) with the largest volume or the smallest input orifice as discussed above. In FIGS. 7 and 8, the first clutch command is illustrated by the line Y. In response to the first clutch command, the appropriate valve 82, 84, or 86 opens, thereby allowing fluid to be transferred from the flow accumulator 23 to the appropriate clutch 13, 15, or 17. For example, if the controller 34 determines that the first clutch 13 should be filled first, the controller 34 sends the first clutch command to the first valve 82 to allow fluid flow from the flow accumulator 23 to the first clutch 13. Thus, step 312 entails, for example, transferring transmission fluid 51 from the flow accumulator 23 to the first clutch 13. At this point, the pressure in the clutch 13, 15, or 17 that receives the transmission fluid 51 first increases. In FIGS. 7 and 8, the pressure in the clutch 13, 15, or 17 that receives transmission fluid 51 first is illustrated by dashed line PY. Further, in FIGS. 7 and 8, the accumulator pressure is illustrated by line A, which is proportional to the accumulator volume. As the transmission fluid 51 (e.g., transmission oil) is transferred from the flow accumulator 23 to the appropriate clutch 13, 15, 17, the pressure in the flow accumulator 23 decreases.

Subsequently, at step 314, the timer 92 beings to run. At step 316, the controller 34 determines if the timer value (i.e., the time pasted since the timer started running) is equal to or greater than the time lapse t1 determined in step 306. If the timer value is not equal to or greater than the determined time lapse t1, the method 300 returns to sub-step 314 and the timer 92 continues to run. If the timer value is equal to or greater than the determined time lapse t1, the method 300 continues to step 318, wherein the controller 34 sends a second clutch command to another designated clutch 13, 15, or 17 to start filling that clutch. In FIGS. 7 and 8, the second clutch command is illustrated by line X.

The timing of the second clutch command may alternatively or additionally be based on the pressure or volume of the transmission fluid 51 in the flow accumulator 23. For example, the controller 34 may determine the accumulator volume or pressure using the volume sensor 90 or pressure sensor 88 and then sends the second clutch command when the accumulator volume reaches a volume threshold. The controller 34 may determine the volume threshold. The timing of the second clutch command is determined such that the clutches are fully filled or reach a predetermined threshold (pressure, volume, and/or displacement threshold) at substantially the same time.

In response to the second clutch command, the appropriate valve 82, 84, or 86 opens, thereby allowing the fluid to be transferred from the flow accumulator 23 to that other designated clutch 13, 15, or 17. For example, if the controller 34 determines that the second clutch 15 should be filled secondly, the controller 34 sends the second clutch command to the second valve 84 to allow fluid flow or transfer from the flow accumulator 23 to the second clutch 15. Thus, step 318 may entail, for example, transferring the transmission fluid 51 from the flow accumulator 23 to the second clutch 15 after the determined time lapse t1 has passed since the first clutch 15 started to be filled. While transmission fluid 51 is transferred to the first and second clutches 13, 15, the controller 34 may close the solenoid valve 50B and the third valve 86 (or any other suitable valve) so the transmission fluid 51 is only transferred to the first and second clutches 13, 17. Thus, step 318 may further include transferring transmission fluid 51 only to the first and second clutches 13, 17.

At step 318, the pressure in the designated clutch (13, 15, or 17) that receives transmission fluid 51 second increases. In FIGS. 7 and 8, the pressure in the clutch 13, 15, or 17 that receives transmission fluid second is illustrated by dashed line PX.

After beginning to fill at least two clutches (13, 15, or 17), the method 300 continues to step 320. At step 320, the controller 34 determines if another clutch (13, 15, or 17) should be filled based on the level of transmission output torque. For example, in step 320, the controller 34 may determine if the third clutch 17 should be applied or filled to achieve the level of transmission output torque. If filling another clutch is not necessary to achieve the level of transmission output torque, the step 308 ends at block 321, and the method 300 ends at step 322 (FIG. 5). If another clutch (13, 15, or 17) must be filled to achieve the level of transmission output torque, the method 300 continues to step 324, wherein the controller 34 determines if the timer value (i.e., the time pasted since the timer started running) is equal to or greater than the time lapse t1 determined in step 306. If the timer value is not equal to or greater than the determined time lapse, the method 300 returns to sub-step 314 and the timer 92 continues to run. If the timer value is equal to or greater than the determined time lapse t2, the method 300 continues to step 326, wherein the controller 34 send a third clutch command to another clutch 13, 15, or 17 to start filling that clutch. Consequently, the appropriate valve 82, 84, or 86 opens, thereby allowing the fluid to be transferred from the flow accumulator 23 to that other clutch. For example, if the controller 34 determines that the third clutch 17 should be filled thirdly, the controller 34 sends the third clutch command to the third valve 86 to allow fluid flow or transfer from the flow accumulator 23 to the third clutch 17.

As shown in FIGS. 7 and 8, the pressures in at least two clutches (13, 15, or 17) reach the respective pressure threshold and/or are fully applied at substantially the same time. In FIGS. 7 and 8, time tx represents a time when at least two clutches (13, 15, or 17) reach respective pressure thresholds TX and TY. The pressures TX and TX may be the pressures when the clutches are fully applied. For example, the first and second clutches 13, 15 may be completely filled at substantially the same time. At this juncture, the transmission 16 can transmit torque form the engine 12 to propel the vehicle 36.

As shown in FIG. 8, the controller 34 may also control the solenoid valve 50B (FIG. 2) to minimize the flow of transmission fluid 51 not directed toward the designated clutches 13, 15, 17. In FIG. 8, the line V represents the actuation of the solenoid valve 50B to maximize the transfer of transmission fluid from the flow accumulator 23 to the clutches 13, 15, or 17. For example, the solenoid valve 50B may completely close to prevent fluid flow to any components of the fluid supply system 10 other than the designated clutches 13, 15, or 17. The solenoid valve 50B may be opened after the designated clutches 13, 15, or 17 reach the predetermined pressure thresholds TX and TY.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for controlling a transmission during a flying engine start, the method comprising:
    receiving a request for an internal combustion engine to be started to generate a level of transmission output torque while a vehicle is solely driven by an electric motor-generator, the vehicle including the internal combustion engine, the electric motor-generator, the transmission, and a flow accumulator, the transmission including a first clutch and a second clutch;
    determining a gear ratio in the transmission according to the level of transmission output torque;
    determining a time lapse between a moment when the first clutch starts to be filled and a moment when the second clutch starts to be filled such that the first clutch and the second clutch reach first and second clutch pressure thresholds, respectively, at substantially the same time;
    transferring a transmission fluid from the flow accumulator to the first clutch; and
    transferring at least some of the transmission fluid from the flow accumulator to the second clutch after the determined time lapse has passed since the first clutch started to be filled.

2. The method of claim 1, further comprising determining a transmission fluid temperature, wherein the time lapse is based on the transmission fluid temperature.

3. The method of claim 1, further comprising determining a volume of the transmission fluid in the flow accumulator, wherein the time lapse is based on the volume of the transmission fluid in the flow accumulator.

4. The method of claim 1, further comprising determining a pressure of the transmission fluid in the flow accumulator, wherein the time lapse is based on the pressure of the transmission fluid in the flow accumulator.

5. The method of claim 1, wherein the time lapse is based on volumes of the transmission fluid in the first and second clutches.

6. The method of claim 1, further comprising determining which of the first and second clutches has to receive the transmission fluid first.

7. The method of claim 6, wherein the first clutch defines a first volume, the second clutch defines a second volume, and the first volume is larger than the second volume.

8. The method of claim 7, wherein the transmission fluid in the flow accumulator is only transferred to the first clutch and the second clutch.

9. The method of claim 1, further comprising determining if a third clutch needs to be filled based on the level of transmission output torque.

10. The method of claim 9, further comprising determining a time lapse between a moment when the second clutch starts to be filled and a moment when the third clutch starts to be filled such that the first clutch, the second clutch, and the third clutch reach first, second, and third clutch pressure thresholds, respectively, at substantially the same time.

11. A vehicle comprising:
    an axle;
    an internal combustion engine operatively coupled to the axle;
    an electric motor-generator;
    a transmission operatively coupled between the engine and the axle, the transmission being configured to transfer torque from the internal combustion engine to the axle, and the transmission including a first clutch and a second clutch;
    a flow accumulator containing transmission fluid;
    a first valve operatively coupled between the flow accumulator and the first clutch, the first valve being configured to control flow of transmission fluid between the flow accumulator and the first clutch;
    a second valve operatively coupled between the flow accumulator and the second clutch, the second valve being configured to control flow of transmission fluid between the flow accumulator and the second clutch; and
    a controller in communication with the first and second valves, the controller being configured to:
        receive a request for the internal combustion engine to be started to generate a level of transmission output torque while the vehicle is solely driven by the electric motor-generator;
        determine a gear ratio in the transmission according to the level of transmission output torque;
        determine a time lapse between a moment when the first clutch starts to be filled and a moment when the second clutch starts to be filled such that the first clutch and the second clutch reach first and second clutch pressure thresholds, respectively, at substantially the same time;
        send a first clutch command to the first valve such that the first valve allows the transmission fluid to be transferred from the flow accumulator to the first clutch; and
        send a second clutch command to the second valve such that the second valve allows at least some of the transmission fluid to be transferred from the flow accumulator to the second clutch after the determined time lapse has passed since the first clutch started to be filled.

12. The vehicle of claim 11, further comprising a temperature sensor configured to determine a temperature of the transmission fluid, wherein the time lapse is based on the temperature of the transmission fluid.

13. The vehicle of claim 11, further comprising a volume sensor configured to determine a volume of the transmission fluid in the flow accumulator, wherein the time lapse is based on the volume of the transmission fluid in the flow accumulator.

14. The vehicle of claim 11, further comprising a pressure sensor configured to determine a pressure of the transmission fluid in the flow accumulator, wherein the time lapse is based on the pressure of the transmission fluid in the flow accumulator.

15. The vehicle of claim 11, wherein the time lapse is based on volumes of transmission fluid in the first and second clutches.

16. The vehicle of claim 11, wherein the controller is configured to determine which of the first and second clutches has to receive the transmission fluid from the flow accumulator first.

17. The vehicle of claim 16, wherein the first clutch defines first volume, the second clutch defines a second volume, and the first volume is larger than the second volume.

18. The vehicle of claim 17, wherein the transmission fluid in the flow accumulator is only transferred to the first clutch and the second clutch.

19. A system, comprising:
a flow accumulator containing transmission fluid;
a first valve in fluid communication with the flow accumulator, the first valve being configured to control flow of transmission fluid between the flow accumulator and a first clutch;
a second valve in fluid communication with flow accumulator, the second valve being configured to control flow of transmission fluid between the flow accumulator and a second clutch; and
a controller in communication with the first and second valves, the controller being configured to:
receive a request for an internal combustion engine to be started to generate a level of transmission output torque while a vehicle is solely driven by an electric motor-generator, the vehicle including the internal combustion engine, the electric motor-generator, a transmission, and a flow accumulator, the transmission including a first clutch and a second clutch;
determine a gear ratio in the transmission according to the level of transmission output torque;
determine a time lapse between a moment when the first clutch starts to be filled and a moment when the second clutch starts to be filled such that the first clutch and the second clutch reach first and second clutch pressure thresholds, respectively, at substantially the same time;
send a first clutch command to the first valve such that the first valve allows the transmission fluid to be transferred from the flow accumulator to the first clutch; and
send a second clutch command to the second valve such that the second valve allows at least some of the transmission fluid to be transferred from the transmission the flow accumulator to the second clutch after the determined time lapse has passed since the first clutch started to be filled.

20. The system of claim 19, wherein the controller is configured to determine at least one of a pressure or a volume in the flow accumulator using a model, and the time lapse is based on at least one of the pressure or the volume in the flow accumulator.

* * * * *